United States Patent
Van Loon et al.

(10) Patent No.: US 6,336,524 B1
(45) Date of Patent: Jan. 8, 2002

(54) BRAKE DEVICE WITH BRAKE ADJUSTMENT SYSTEM

(75) Inventors: Laurentius Petrus Joseph Van Loon, Slootdorp; Cornelis Petrus Maria Portegies, Midwoud, both of (NL)

(73) Assignee: Driessen Aircraft Holding B.V., Wieringerwerf (NL)

( * ) Notice: Subject to any disclaimer, the term of this patent is extended or adjusted under 35 U.S.C. 154(b) by 0 days.

(21) Appl. No.: 09/579,465

(22) Filed: May 26, 2000

(30) Foreign Application Priority Data

May 26, 1999 (NL) ............................................. 1012157

(51) Int. Cl.⁷ ............................................. B60B 33/00
(52) U.S. Cl. ........................ 188/1.12; 16/35 R; 188/19
(58) Field of Search ........................... 188/74, 1.12, 19, 188/31, 69, 20, 265, 17; 16/35 R, 38, 43, 35 D

(56) References Cited

U.S. PATENT DOCUMENTS

| | | | |
|---|---|---|---|
| 4,722,114 A | | 2/1988 | Neumann |
| 4,815,161 A | * | 3/1989 | Timmer et al. ............. 16/35 R |
| 4,938,644 A | * | 7/1990 | Runels ........................ 411/132 |
| 4,998,320 A | * | 3/1991 | Lange ........................ 16/35 R |
| 5,303,450 A | * | 4/1994 | Lange ........................ 16/35 D |
| 5,774,936 A | * | 7/1998 | Vetter ......................... 16/35 R |

FOREIGN PATENT DOCUMENTS

| | | | |
|---|---|---|---|
| CH | 350774 | | 1/1961 |
| DE | 2347900 | * | 4/1974 |
| DE | 19534424 A1 | | 3/1997 |
| DE | 29814458 U1 | | 1/1999 |
| EP | 0118055 A2 | | 9/1984 |
| EP | 0399235 A2 | | 11/1990 |
| WO | WO 9906260 | | 2/1999 |

* cited by examiner

Primary Examiner—Robert J. Oberleitner
Assistant Examiner—Melanie Torres
(74) Attorney, Agent, or Firm—Young & Thompson

(57) ABSTRACT

A wheel assembly provided with a bracket (1), a wheel (5) which is mounted in the bracket (1) it such a manner that it can rotate about an axle (4), a brake member (7) which can move with respect to the wheel (5) and has a brake pin (8) provided with a screw thread, around the brake pin a displaceable brake disc (9) provided with a complementary screw thread, and a locking disc (11) for fixing the position of the brake disc (9) along the screw thread. The locking disc (11) is provided with at least one pawl (12) which is positioned radially with respect to the brake pin and can be displaced substantially in the axial direction of the brake pin (8). The brake disc (9) comprises at least one radial slot (10) for accommodating the pawl (12) in order to block the displacement of the brake disc (9) along the axis of the brake pin (8).

12 Claims, 1 Drawing Sheet

BRAKE DEVICE WITH BRAKE ADJUSTMENT SYSTEM

BACKGROUND OF THE INVENTION

The invention relates to a wheel assembly provided with a bracket, a wheel which is mounted in the bracket in such a manner that it can rotate about an axle, a brake member which can move with respect to the wheel and has a brake pin provided with a screw thread, around the brake pin a displaceable brake disc provided with a complementary screw thread, and a locking disc for fixing the position of the brake disc along the screw thread. When the brake pin is moved in the direction of its axis towards the wheel, the brake disc can engage on the wheel in order to brake the wheel.

Wheel assemblies of this type are known and are assembled by the applicant. They are used, for example, in trolleys for catering in aircraft.

Owing to wear on the engagement surface of the wheel mid of the brake disc itself, the braking action may deteriorate over the course of time. To overcome this problem, the position of the brake disc on the brake pin is variable. To displace the brake disc along the brake pin, the locking disc has to be uncoupled, the brake disc has to be moved into the correct position, and finally the locking disc has to be fitted again. According to the prior art, the locking disc is clamped between the brake disc and a locking nut. The locking disc is difficult to remove and fit, since the locking nut, which is situated between the wheel and die bracket, is difficult to reach. Moreover, a tool is required.

SUMMARY OF THE INVENTION

One object of the present invention is to make it easier to remove mid fit the locking disc and to enable this to be done without using a tool, To this end, according to the present invention the locking disc is provided with at least one pawl which is positioned radially with respect to the brake pin and can be displaced substantially in the axial direction of the brake pin. The brake disc is provided with at least one radial slot for accommodating the said pawl in order to prevent the rotation of the brake disc.

Since the rotation of the brake disc is blocked only by the axially projecting pawl, the brake disc can be released by lifting the pawl out of the radial slot. This can be done without using a tool, thus considerably simplifying adjustment of the brake disc.

In a preferred embodiment, the pawl is pressed into the slot by a compression spring. It is preferable for the compression spring to be positioned around the brake pin. It is also preferable for the pawl to be provided with an eyelet which is positioned around the brake pin, the brake pin and the eyelet being flattened on one side in order to prevent rotation of the pawl.

This design uses a small number of components to prevent, in a manner which is robust and requires little maintenance, the pawl from being able to come out of the slot unintentionally, enabling the brake disc to rotate, while continuing to allow simple adjustment of the brake disc without the need for a tool.

In the above preferred embodiments the pawl may also be provided with a lip at its end, which simplifies manual displacement of the pawl in the axial direction,

BRIEF DESCRIPTION OF THE DRAWING

The invention is explained in more detail below with reference to the drawings, in which.

DESCRIPTION OF THE PREFERRED EMBODIMENTS

Figure 1:
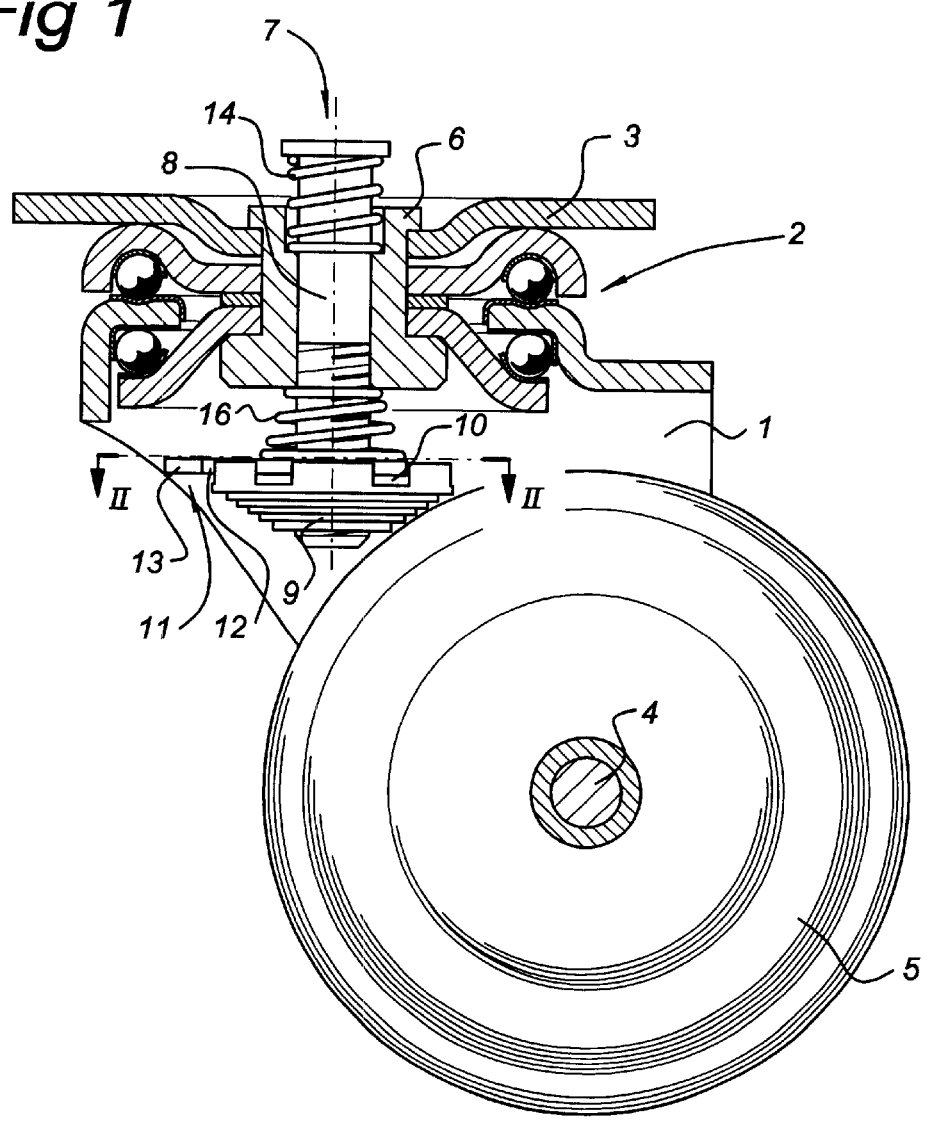
FIG. 1 Shows a cross section through the wheel assembly with a brake device.

To ensure that the brake disc 9 does not rotate in an undesired manner so that its height varies, the brake disc 9 is provided with slots 10. A pawl 12 on the locking disc 11 which is secured around the brake pin 8 can latch into one of these slots, so that the rotation of the brake disc 9 is blocked. To ensure that the locking disc 11 itself cannot rotate with the brake disc 9, the eyelet 15 in the locking disc 11 and the brake pin 8 are designed with a flat section, which sections engage on one another.

The wheel assembly as shown in FIG. 1 comprises a bracket 1 which is rotatably connected, via a pivot member, denoted overall by reference numeral 2, to an attachment plate 3, A wheel 5, which is mounted around an axle 4, is mounted in the bracket 1. A brake member 7 which can move wit respect to the wheel 5 is mounted in a bush 6. The brake member 7 comprises a brake pin 8 on which a brake disc 9 is fitted. As a result of the brake pin being moved in the direction of the wheel 5, it is possible for the brake disc 9 to engage on the wheel 5. The embodiment shown is provided with a compression spring 14 which holds the brake disc 9 in a clear position when it is not activated.

The wheel assembly is attached to the bottom of a trolley, for example, by means of the attachment plate 3, the trolley being designed with a brake mechanism which, via a transmission system, presses the brake pin on to die wheel. When the brake system is released, the brake disc is moved away from die wheel by the spring 14, and the wheel is able to rotate again.

The brake pin 8 is provided with a screw thread on which the brake disc 9, which is provided with a complementary screw thread, is mounted. As a result of the brake disc 9 being rotated, it can be displaced in the direction parallel to the axis of the brake pin 8. This is important when the surface of die wheel 5 and/or of the brake disc itself becomes worn, with the result that insufficient friction is generated, To ensure that the brake disc 9 does not rotate in an undesired manner so that its height varies, the brake disc 9 is provided with slots 10. A pawl 12 on the locking disc 11 which is secured around the brake pin 8 can latch into one of these slots, so that the rotation of the brake disc 9 is blocked. To ensure that the locking disc 11 itself cannot rotate with the brake disc 9, the eyelet in the locking disc 11 and the brake pin 8 are designed with a flat section, which sections engage on one another, To hold the pawl 12 in the slot 10, it is pressed into the slot by means of a compression spring 16. By means of the lip 13, the pawl 12 can be lifted out of the slot 10, counter to the pressure of spring 16, in order to enable the brake head 9 to rotate with respect to both the brake pin 8 and the pawl 12.

Figure 2:
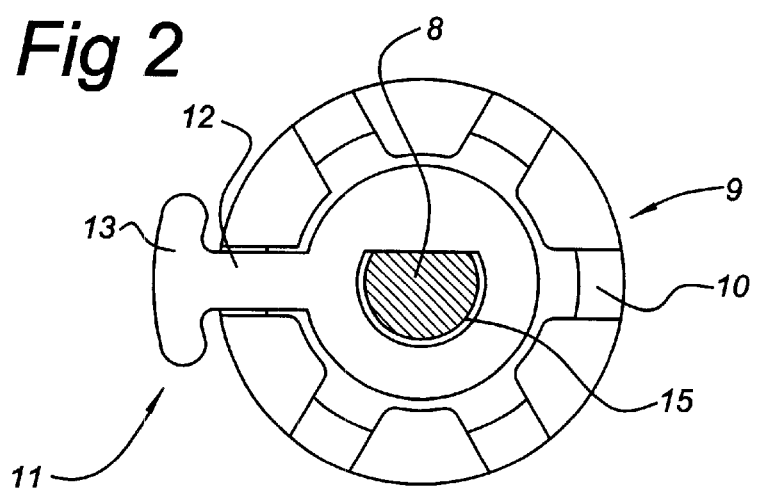
FIG. 2 shows a cross section on line II-II through the brake assembly from FIG. 1.

FIG. 2 shows a cross section on line II-II through the brake assembly 1 shown in FIG. 1. The flattened parts of the brake pin 8 and the locking disc 11 can be seen clearly. Since the pawl 12 has been pressed into one of the slots 10, it is impossible for the brake disc 9 to rotate with respect to the brake pin 8.

What is claimed is:

1. A wheel assembly provided with a bracket (1), a wheel (5) which is mounted in the bracket (1) in such a manner that it can rotate about an axle (4), a brake member (7) which can move with respect to the wheel (5) and has a brake pin (8) provided with a screw thread, a displaceable brake disc (9) around the brake pin and provided with a complementary screw thread, and a locking disc (11) for fixing the position of the brake disc (9) along the screw thread, wherein the locking disc (11) comprises at least one pawl (12) which extends radially with respect to the brake pin and which is displaceable substantially in the axial direction of the brake pin (8) and which is secured against rotation around the brake pin (8), the brake disc having at least one radial slot (10) accommodating the pawl (12) in order to block rotation of the brake disc (9) along the axis of the brake pin (8), and wherein a spring member (16) acts on one of the locking disc (11) and the pawl (12) and pressing the said pawl (12) into the slot (10) in the brake disc (9).

2. The wheel assembly according to claim 1, wherein the spring member (16) comprises a compression spring which is positioned around the brake pin (8).

3. The wheel assembly according to claim 1, wherein the locking disc (11) is provided with an eyelet (15) which is positioned around the brake pin (8), the brake pin (8) and the eyelet (15) being flattened on at least one side in order to block the rotation of the locking disc (11) about the axis of the brake pin (8).

4. The wheel assembly according to claim 1, wherein the pawl (12) is provided, at its free end, with lip (13) for manual displacement of the pawl (12) in the axial direction.

5. The wheel assembly according to claim 4, wherein the locking disc (11) is provided with an eyelet (15) which is positioned around the brake pin (8), the brake pin (8) and the eyelet (15) being flattened on at least one side in order to block the rotation of the locking disc (11) about the axis of the brake pin (8).

6. A wheel assembly comprising:

a bracket;

a rotatable wheel mounted on said bracket; and a brake member mounted on said bracket, said brake member comprising
      a brake pin with a screw thread,
      a brake disc that is mounted on said brake pin with a complementary screw thread and that is displaceable relative to said rotatable wheel, said brake disc having at least one radial slot, and
      a locking disc that fixes a position of said brake disc on said brake pin, said locking disc comprising a pawl that extends radially relative to said brake pin and into said at least one radial slot to prevent rotation of said pawl and of said brake disc and that is displaceable in an axial direction of said brake pin into and out of said at least one radial slot.

7. The wheel assembly of claim 6, wherein said brake member comprises a spring urging said pawl into said at least one radial slot.

8. The wheel assembly of claim 7, wherein said pawl has a free end with a lip that is manually displaceable in the axial direction.

9. The wheel assembly of claim 7, further comprising a bushing around said brake pin, and wherein said spring presses against said bushing.

10. The wheel assembly of claim 7, further comprising a second spring that urges said brake disc away from said wheel.

11. The wheel assembly of claim 6, wherein said at leas one radial slot is in a surface of said brake disc opposite a surface of said brake disc that engages said wheel.

12. A wheel assembly comprising:

a bracket;

a rotatable wheel mounted on said bracket; and a brake member mounted on said bracket, said brake member comprising
      a brake pin with a screw thread,
      a brake disc that is mounted on said brake pin with a complementary screw thread and that is displaceable relative to said rotatable wheel, said brake disc having at least one radial slot,
      a locking disc that fixes a position of said brake disc on said brake pin, said locking disc comprising a pawl that extends radially relative to said brake pin and into said at least one radial slot to prevent rotation of said pawl and of said brake disc and that is displaceable in an axial direction of said brake pin into and out of said at least one radial slot, said pawl having a free end with a lip that is manually displaceable in the axial direction.

* * * * *